(12) United States Patent
Maier et al.

(10) Patent No.: US 7,246,634 B2
(45) Date of Patent: Jul. 24, 2007

(54) DRILL FOR TAPPING PIPE WITH SAFETY DEVICE IN BRANCH PIPE

(75) Inventors: Fabian Maier, Westheim (DE); Wolfgang Sichler, Mannheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 72 days.

(21) Appl. No.: 10/484,735

(22) PCT Filed: Jan. 15, 2003

(86) PCT No.: PCT/EP03/00350

§ 371 (c)(1),
(2), (4) Date: Oct. 4, 2004

(87) PCT Pub. No.: WO03/062695

PCT Pub. Date: Jul. 31, 2003

(65) Prior Publication Data

US 2005/0034762 A1 Feb. 17, 2005

(30) Foreign Application Priority Data

Jan. 23, 2002 (DE) ............................. 102 02 676

(51) Int. Cl.
*F16L 55/18* (2006.01)
(52) U.S. Cl. .................... 137/318; 137/322; 137/461; 137/462; 251/149.3; 408/101
(58) Field of Classification Search .............. 137/318, 137/455, 320, 322, 462, 461, 460, 456; 222/91, 222/81, 82, 83; 251/149.3

See application file for complete search history.

(56) References Cited

U.S. PATENT DOCUMENTS

| | | | | | |
|---|---|---|---|---|---|
| 4,204,559 | A | * | 5/1980 | Wagner | 137/318 |
| 5,577,529 | A | * | 11/1996 | Katz | 137/318 |
| 5,694,971 | A | * | 12/1997 | Wilcock | 137/318 |
| 5,732,732 | A | * | 3/1998 | Gross et al. | 137/318 |
| 5,975,117 | A | * | 11/1999 | Schweitzer et al. | 137/318 |
| 6,220,274 | B1 | * | 4/2001 | Wang | 137/231 |
| 6,758,237 | B2 | * | 7/2004 | Sichler et al. | 137/318 |
| 2003/0136445 | A1 | * | 7/2003 | Sichler et al. | 137/318 |

FOREIGN PATENT DOCUMENTS

DE 10 28 839 4/1958

(Continued)

*Primary Examiner*—Eric Keasel
*Assistant Examiner*—Craig Schneider
(74) *Attorney, Agent, or Firm*—Jordan and Hamburg LLP

(57) ABSTRACT

A fitting for connection to a pipe includes a sleeve, in which a body is axially displaced along a sleeve axis, whereby the body has a drill for drilling into the pipe and/or a valve body of a valve. The fitting also includes a branch sleeve, located in particular on the sleeve and to which a branch line can be connected. The fitting is easily constructed in such a way that safety requirements are reliably met and such that a connection to a branch line can be easily established if necessary. According to another aspect of the fitting, a locking device which includes an actuating element is located in the branch sleeve, in such a way that the locking device is actuated by means of the axially displaceable body in the sleeve.

16 Claims, 5 Drawing Sheets

FOREIGN PATENT DOCUMENTS

| | | |
|---|---|---|
| DE | 1 153 591 | 8/1963 |
| DE | 93 19 910.4 | 5/1994 |
| EP | 0 572 817 | 12/1993 |
| EP | 0 845 630 | 6/1998 |
| FR | 616 904 | 2/1927 |
| FR | 2 744 194 | 8/1997 |
| JP | 2001 059594 | 3/2001 |
| WO | 01/96778 | 12/2001 |

* cited by examiner

DRILL FOR TAPPING PIPE WITH SAFETY DEVICE IN BRANCH PIPE

BACKGROUND OF THE INVENTION

The invention relates to a fitting, particularly, for a pipe that is a spot-drilling fitting.

A spot-drilling fitting is known from European Patent EP 0 845 630 A2. It includes a housing which is made of plastic and can be connected by electric welding with a plastic pipe. The fitting contains a connecting piece, in which a body, having a drill, can be moved axially to the connecting piece axis in such a manner that a borehole can be introduced into the pipe. The connecting piece has a branch connecting piece which is positioned at a right angle to the body of the connecting piece, for connecting a branch pipeline, in which after the pipe is spot drilled, the medium, such as water or gas, flowing in the pipe, can flow into the branch pipeline. Furthermore, EP 0 572 817 B 1 discloses a spot-drilling fitting with an integrated valve, by which the connection between the pipe and the branch pipeline can be closed or opened, as required.

German utility patent DE 93 910 U1 discloses an electric welding sleeve for connecting gas pipelines made of plastic. This electric welding sleeve includes a safety closing device, by which in the event of a pipe break, the supply pipeline is closed off, so that the gas is prevented from flowing out. Where the safety closing device is constructed as a valve, the valve seat is connected with the electric welding sleeve and the valve body and a sealing element are positioned so that they can be moved axially in the electric welding sleeve under the action of a spring. After the valve has been closed automatically, for example, because of a specified pressure difference and/or a pipe break upstream of the closing device, and after the pipe break has been repaired, special measures, such as the application of a counter-pressure, often requiring considerable effort, are required for reopening the flow path when reopening the valve.

BRIEF SUMMARY OF THE INVENTION

It is, therefore, an object of the present invention to develop a fitting of the aforementioned type having a low construction cost, and operating in such a way that safety requirements are fulfilled with a high degree of reliability and, when required, connection to a branch pipeline can be easily established. A smaller overall size is achieved and manufacturing and installation costs are reduced.

This object is accomplished by a fitting for connection to a pipe, the fitting including a connecting piece, having a body which is axially moveable along an axis of the connecting piece; the body of the connecting piece having a drill for spot-drilling a pipe or a valve; the fitting further having a branch connecting piece for connecting to a branch pipeline, and a closing device with an actuating element in the branch connecting piece, such that actuation of the closing device can be performed in the connecting piece by the connecting piece body.

The fitting of the present invention is distinguished by simple construction which satisfies the requirements of the valve and by the integrated safety closing device which is actuated by the body which is axially moveable in the connecting piece. The closing device contains an actuating element which is brought into engagement with the body in such a manner that the closing device opens up the connection between the pipe which is connected to the fitting, and the attached branch pipeline which enables the medium, such as, gas or water to flow through the pipe into the branch pipeline. The closing device, therefore, is activated externally. The safety closing device is constructed as an automatically closing valve with a valve body and/or a sealing element in such a manner that for example, in the event that the connected branch pipeline is damaged or has suffered a break, the connection to the pipe is blocked, so that the medium cannot flow out. When the defect is eliminated, the body can be brought into engagement with the actuating element simply by an axial movement, in order to open the safety closing device once again and to reopen the flow path into the branch pipeline.

The body which is axially movable in the connecting piece, may contain, in a known manner, a drill for spot-drilling the pipe which is connected with the fitting, and/or a valve body, the fitting being constructed as a spot-drilling fitting or as a valve fitting and/or a combined spot-drilling/valve fitting. These functions can also be carried out advantageously if the flow medium is present under pressure in the pipe or the pipeline of a supply network, such as for gas or water. The fitting may be made of metal as well as of plastic, especially of polyethylene. In the latter case, the connection with the exterior surface of the pipe can be established in a known manner by electric welding. The branch connecting piece, accommodating the safety closing device, preferably is an integral component of the housing of the fitting. Furthermore, within the scope of the invention, the branch connecting piece may be suitably connected, such as by electric welding or over a thread connection with the connecting piece of the fitting containing the axially moveable body. Moreover, the free end of the outflow connecting piece, as an insertion end, may be suitably constructed in the same way as the connecting means and, in particular, have an electric welding sleeve for connection to the branch pipeline. Moreover, when the body is constructed with only one drill, a separate valve function can be eliminated, and is instead performed by the body or the drill, and the connection between the pipe and the branch pipeline can be completely blocked, when required, by the closing device of the invention in the branch connecting piece.

Further embodiments of the invention are presented in the following detailed description and examples.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
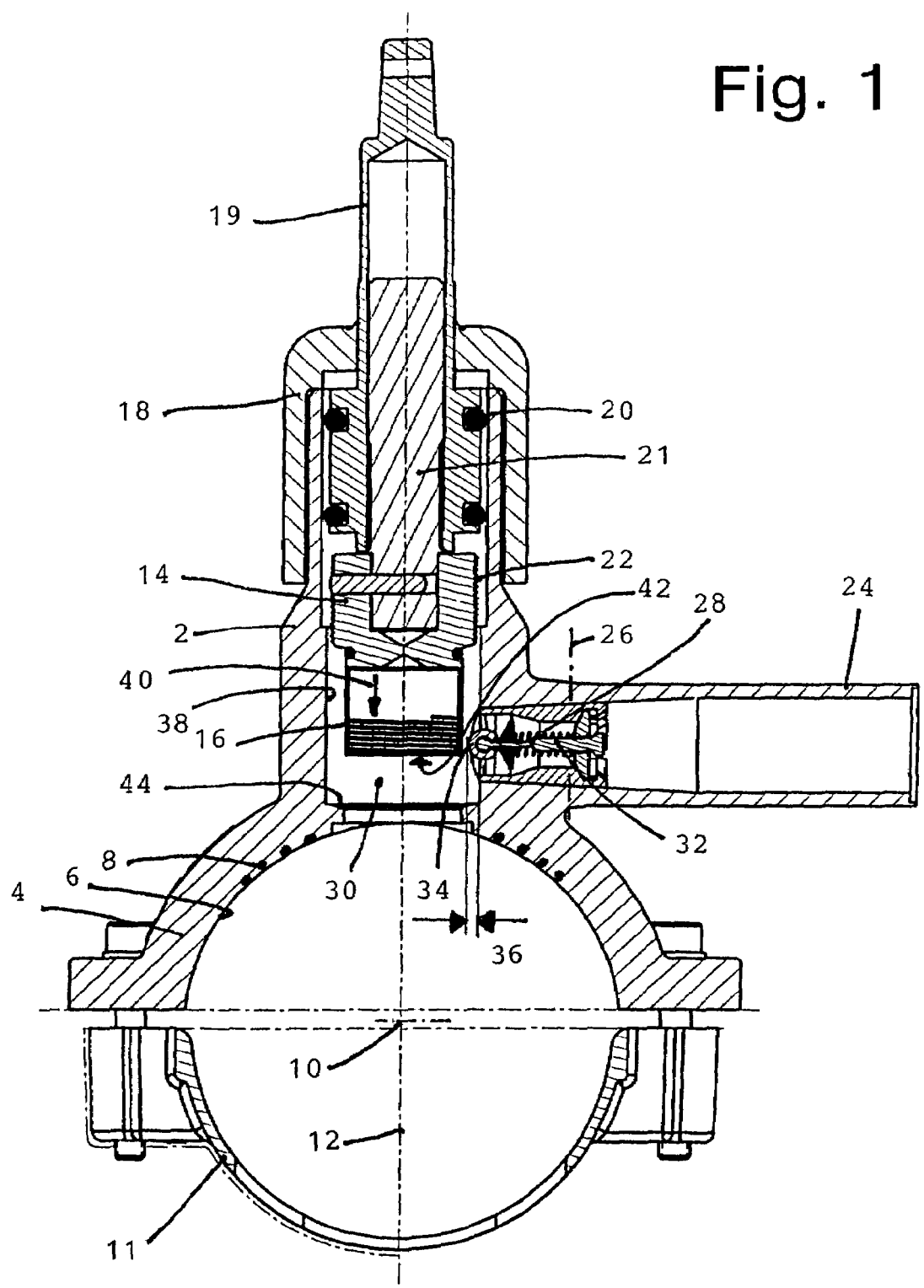
FIG. 1 schematically shows an axial section of a fitting of the present invention, constructed as a spot-drilling fitting, with an integrated safety closing device.

FIG. 1 is a sectional view through a fitting which is constructed as a spot-drilling fitting, with a plastic housing, especially of polyethylene which has a connecting piece 2 and a saddle piece 4. At an inner surface 6 of the saddle piece, the saddle piece 4 contains a heating coil 8, by which a tight and firm connection with a plastic pipe (not shown), is accomplished in a known manner.

The inner surface 6 is essentially coaxial with a longitudinal axis 10 which is orthogonal to the plane of the drawing and coincides approximately with the longitudinal axis of the pipe. The saddle piece 4 can be fixed to the pipe by a clamp 11 in a known manner. A body 14 which is axially moveable along the axis 12 of the connecting piece and which in the drawing is provided with a drill 16, at the lower end of the connecting piece 2, for spot drilling the pipe. According to the drawing, the connecting piece 2 is closed off at the top by means of a cap 18, through which a spindle 19 which can be rotated about the axis 12 of the connecting piece, is passed. The spindle 19 which protrudes into the connecting piece 2, is sealed by means of ring seals 20 with respect to the inner surface of the connecting piece 2 or a guide bushing or threaded bushing (not shown), preferably is made of metal and is positioned non-rotationally and axially not displaceable in the plastic of the fitting or of the connecting piece 2. A lug 21, with which the axially movable body 14 is connected non-rotationally, engages the hollow spindle 19 telescopically from below. The lug 21 is mounted axially displaceably in the interior of the spindle 19 and the body 14 has an external thread 22 at its outer surface. The external thread 22 engages or cuts the internal surface of the connecting piece 2. By rotating the spindle 19, the drill 16 can be moved (in a downward direction in the drawing) for spot-drilling the pipe. After spot drilling, the drill 16 can be moved axially upward once again into the position shown by rotating the spindle 19 in the opposite direction. Alternatively, the connecting piece 2 may contain the aforementioned guide bushing with an internal thread which is engaged by the external thread 22 of the body 14.

A branch connecting piece 24 for connecting a branch pipeline is positioned laterally at the connecting piece 2, preferably orthogonally to the axis 12 of the connecting piece. The free end of the branch connecting piece 24 is constructed as an insertion end in order to be connectable with the branch pipeline, especially by an electric welding sleeve. Alternatively, the free end of the branch connecting piece 24 may have suitable connecting means, such as an electric welding sleeve or a threaded connection or the like, for connecting the branch pipeline. The branch connecting piece 24 preferably is an integral component of the housing or is connected as a single piece with the connecting piece 2. Within the scope of the invention, the branch connecting piece may also be constructed as a separate component and, as indicated by the line 26 of dots and dashes, be connected with the fitting housing in a suitable manner, such as by an electrically welded connection or, if the housing fitting and the branch connecting piece are constructed of metal, by a threaded connection or the like with the fitting housing.

Pursuant to the invention, a closing device 28, shown schematically, and constructed, in particular, as a safety closing device, is positioned in the branch connecting piece. Preferably, the closing device 28 is constructed in such a manner that at a specifiable pressure drop in the connected branch pipe line, for example, in the case of damage or a break in the branch pipe line, the connection between the pipe or the interior space 30 of the connecting piece 2 and the branch pipe line is automatically blocked or interrupted and the leakage of flow medium is prevented.

The closing device 28 is constructed as a valve which closes automatically due to the existence of a specifiable pressure difference between the interior space 30 and the branch pipe line, the latter of which is connected in series in the flow direction, and contains an actuating element 32, with which when necessary, the connection can be reestablished. The actuating element 32 is constructed and/or positioned in such a manner that in the blocked position of the closing device 28, it can be brought into engagement with the body 14. For this purpose, the actuating element 32 protrudes with its free end 34 by a specified distance 36 beyond the inner surface 38 of the interior space 30. By axially moving the body 14 in the direction of the arrow 40, the body 14 with the actuating element 32 or its free end 34, are engaged in such a manner that the actuating element 32 is moved (shifted to the right as seen in the drawing) for opening the safety closing device 28. According to the invention, the closing device 28 is activated externally by the body 14.

The body 14 accordingly has a double function in that it is used in a known manner for spot drilling the pipe, and it is used for activating the closing device 28 externally. The body 14, in addition or alternatively to the drill 16, can be constructed as a component of a valve and contain a valve body or sealing surface 42 which can be brought into a sealing engagement with a valve seat 44 which is disposed at the lower end in the interior of the connecting piece 2 or the fitting housing.

Figure 2:
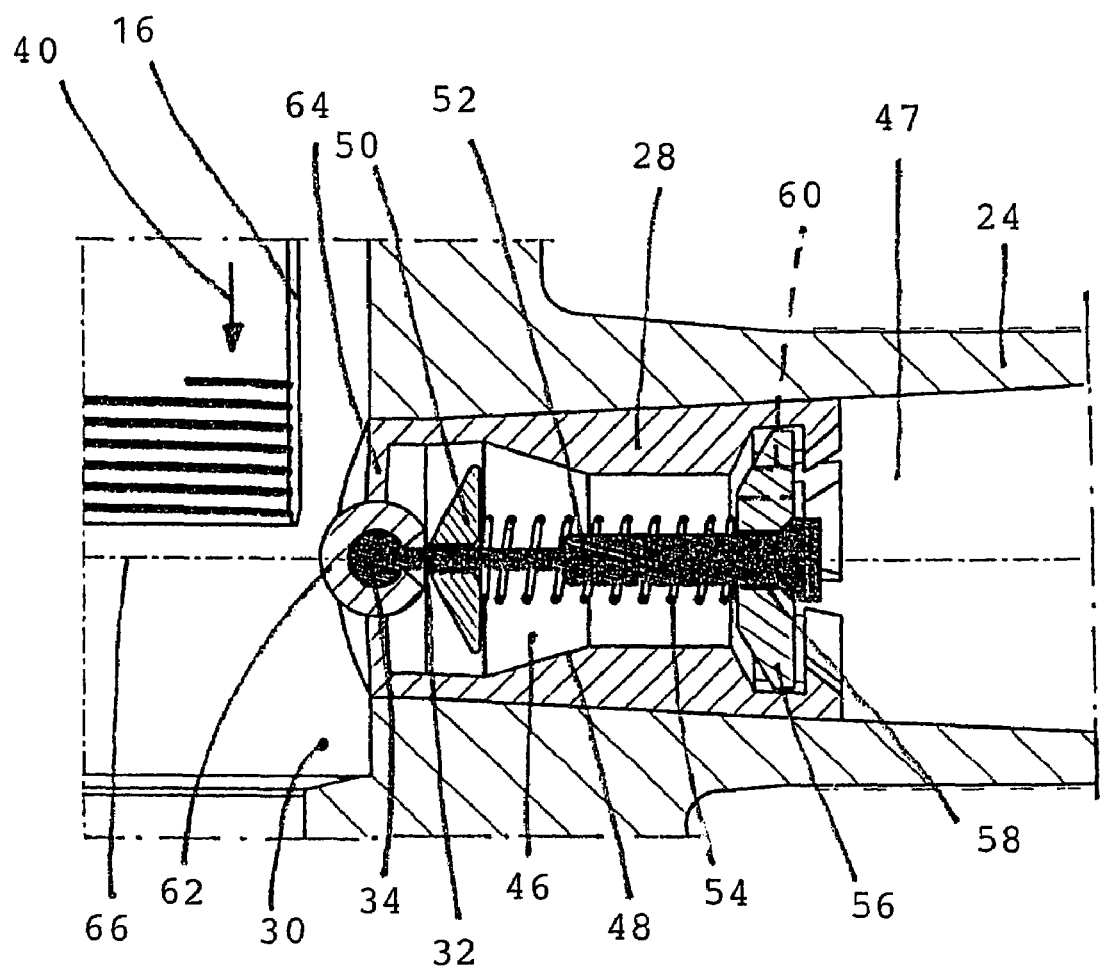
FIG. 2 is an enlarged detailed representation of a safety closing device, with a connection to the branch connecting piece being open.

FIG. 2 shows the fitting on an enlarged scale with an alternative embodiment of the closing device 28 which is provided in the interior space 47 of the branch connecting piece 24. In comparison to FIG. 1, it is shown here that the drill 16 can be moved in the direction of arrow 40 as far as into the region of the closing device 28.

The interior of the closing device 28 contains a space 46 with a valve seat 48, to which a valve body 50 is attached, for the passage of the flowing medium. The valve body 50 is in the open position, so that the medium can flow from the interior space 30 through the passage space 48 into the interior space 47 of the branch connecting piece 24 and, from there, into the connected branch line. The valve body 50 is positioned on a bolt-like guide body 52 and is intercepted by means of a spring element 54 on a backing 56 which is supported in the manner shown in the interior of the closing device 28. The backing 56 contains a central borehole 58 for the guide body 52 and, further removed radially, passage boreholes 60 for the flowing medium.

According to the invention, the actuating element 32 which preferably is an integral component of the guide body 52 and has a free end 34, is assigned to the valve body 50. As can be seen, the free end 34 is constructed at least partially spherically, and/or as a bearing element, and is surrounded at least partially by a bearing body 62 which is intercepted in the closing device 28 and/or the fitting housing by radial webs 64. There are free passages for the flowing medium between the webs 64 which preferably are disposed radially. The webs 64 and/or the bearing body 62 are constructed and/or flexibly positioned in such a manner that the guide body 52 can be moved in the direction of the axis 66 with the actuating element 34, as is explained in greater detail in the following.

Figure 3:
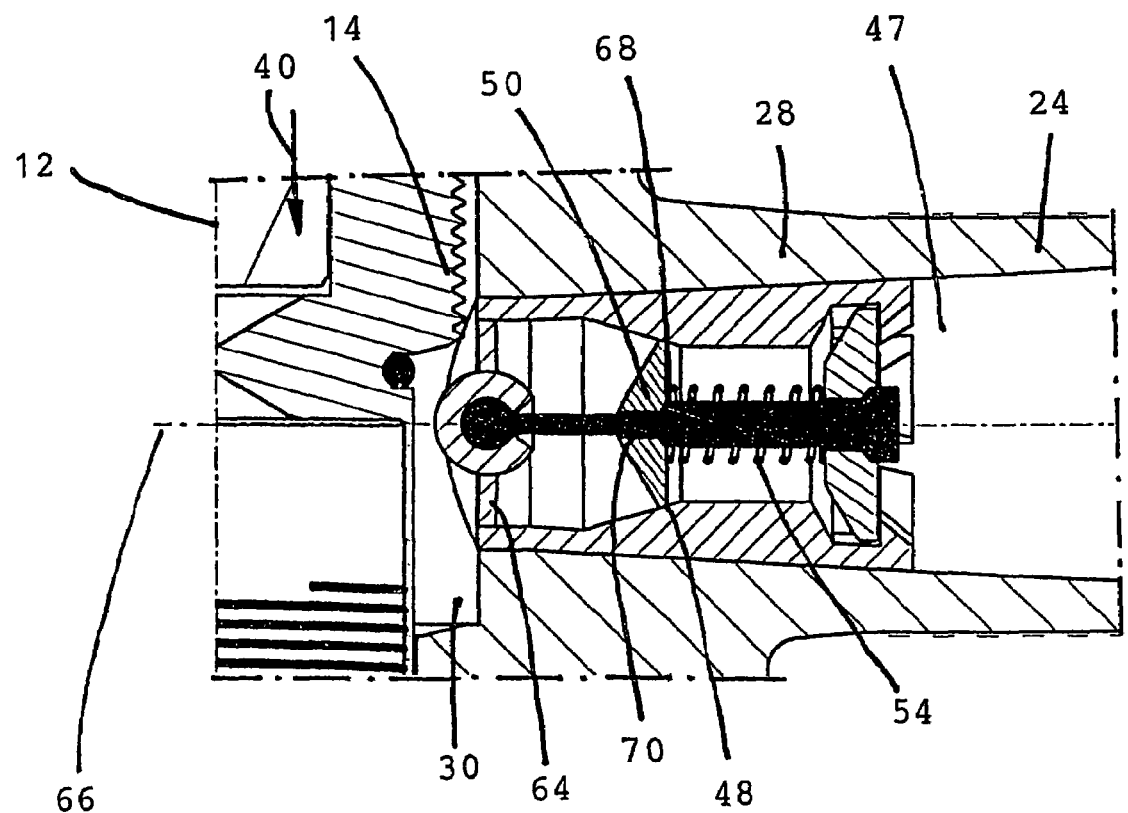
FIG. 3 is a detailed representation, of the safety closing device of FIG. 2, with the connection closed.

According to FIG. 3, the closing device 28 is shown in the closed position, in which the connection between the interior space 30 of the fitting or the connecting piece and the interior space 47 of the branch connecting piece 28 is blocked. As a result of a pressure difference between the two interior spaces 30 and 47, the valve body 50 is pressed by the pressure of the medium in the interior space 30 (towards the right in the drawing) onto the valve seat 48 which is preferably a conical valve seat 48, in such a manner that the connection is blocked by the automatically acting safety closing device 28. The valve body 50 rests on a preferably conical seating 48 of the guide body 52 in such a manner that in the region of a central bushing 70 of the valve body 52, the connection is closed off tightly.

Figure 4:
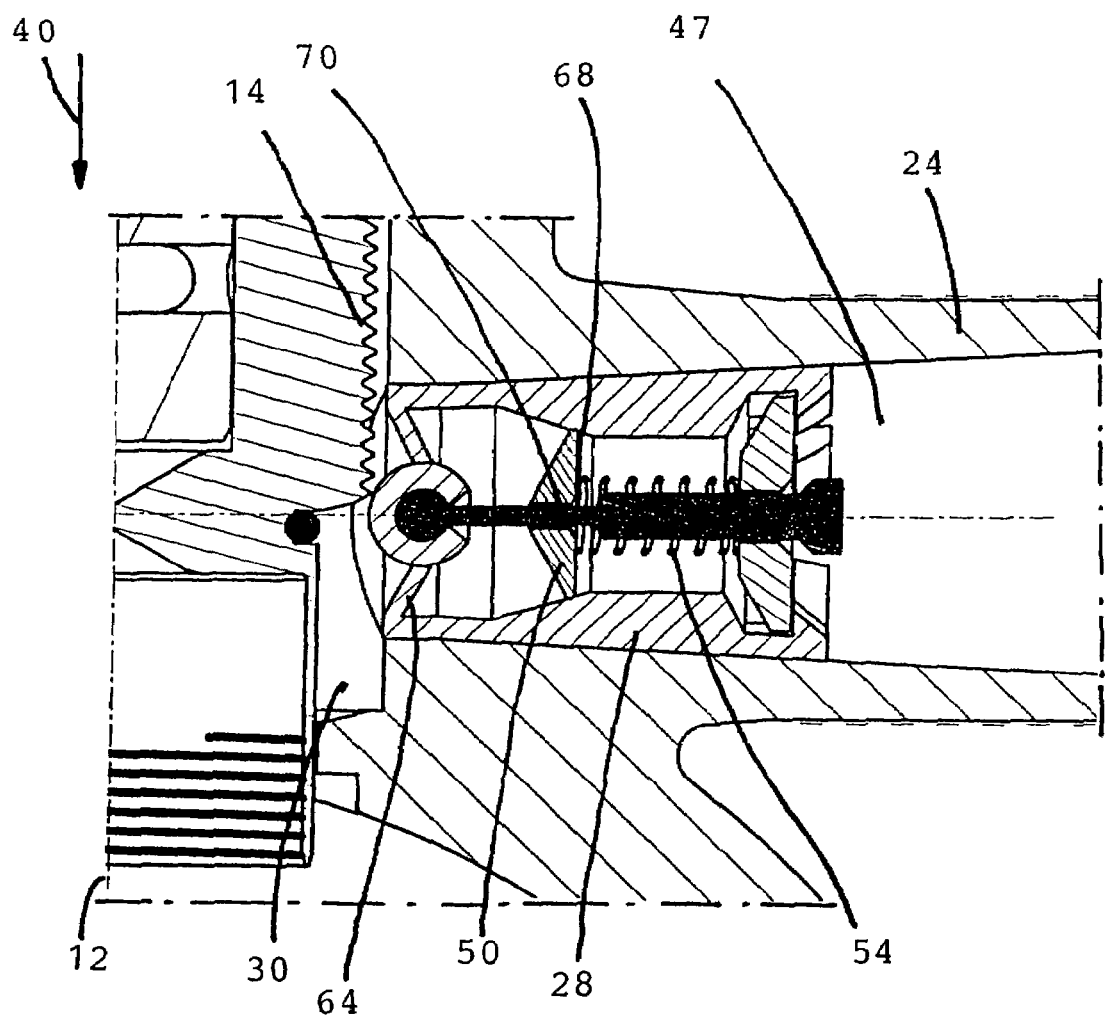
FIG. 4 is a detailed representation, of the safety closing device of FIG. 2, at the onset of opening of the connection.

FIG. 4 is a detailed representation of the fitting at the start of opening of the connection between the two interior space 30 and 47 because of external activation of the safety closing device 28 by means of the body 14. The body 14 then moves downward in the direction of arrow 40 a sufficient distance that the actuating element 32, because of the engagement of the body 14, is moved (to the right in the drawing) in the direction of axis 68. In this way, a small gap, through which pressure equalization between the interior spaces 30 and 47 becomes possible, is formed between the valve body 50 and the seat 68, since there is an annular gap between the central bushing 70 and the guide body 52. The valve body 50 is then shifted (to the left in the drawing) in the direction of the interior space 30 of the fitting by means of spring element 54 which is constructed as a compression spring.

Figure 5:
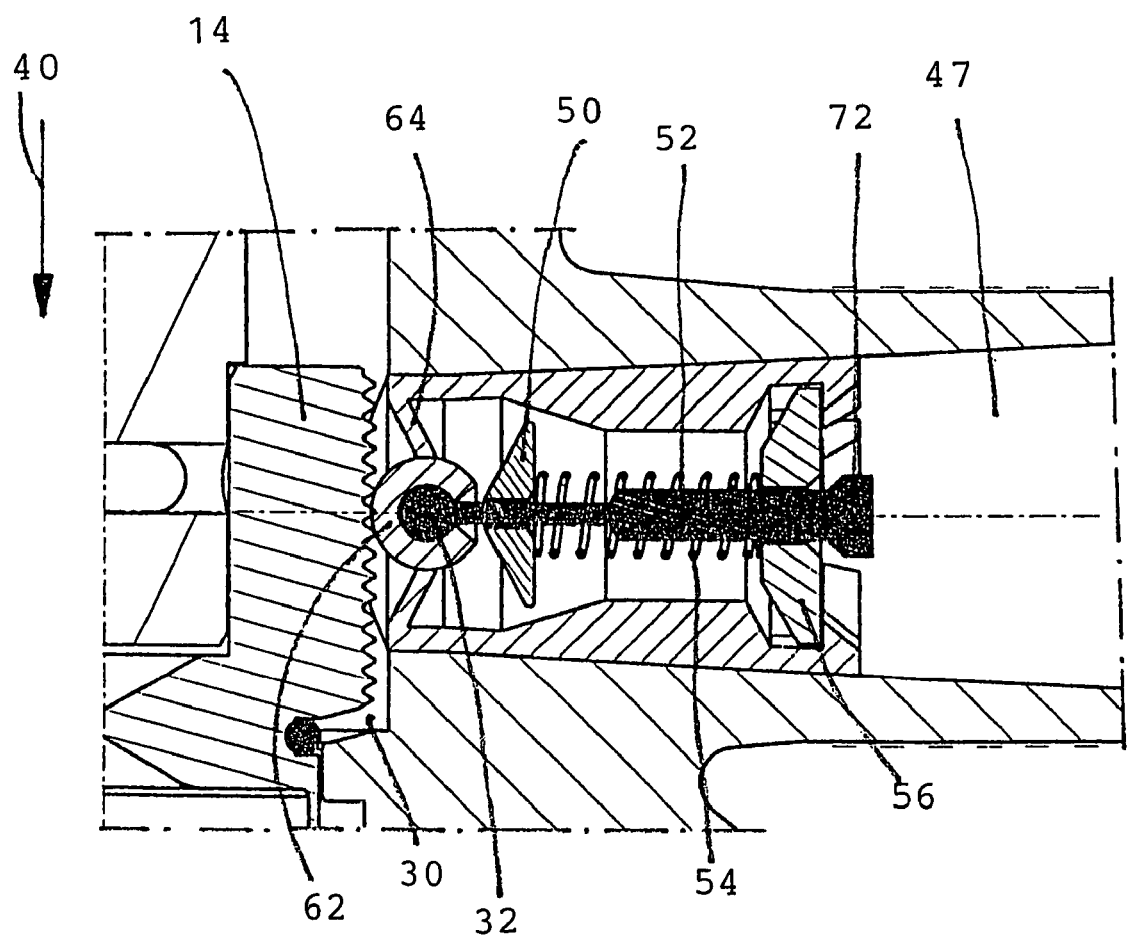
FIG. 5 is a detailed representation, of the safety closing device of FIG. 2, with the connection open.

FIG. 5 shows the closing device after the connection has been opened, the valve body 50 now having been moved by means of the spring element 54 completely in the direction of the interior space 30. Subsequently, if the body 14 is moved upward counter to the direction of the arrow 40 until the body 14 is disengaged from the actuating element 32 and/or the bearing body 62, the valve body 50 and the guide body 52 with the integrated actuating element 32 are moved further in the direction of the interior space 30 by the spring element 54, until the starting position, illustrated in FIG. 2, is assumed.

In this starting position, the guide body 52 is located in a defined position with respect to the backing 56 by means of the expanded shoulder 72. The webs 64 are constructed to be elastically compliable, so that the movements of the bearing body 62 and, also the guide body 52, as previously described, can be carried out readily. The bearing body 62 and the webs 64 preferably are made of plastic and, more preferably, are a component of a plastic sleeve of the closing device 28. Moreover, the sleeve of the closing device can also be an integral component of the fitting and be constructed as a single piece with the latter.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A fitting, comprising:
a connecting piece for connection to a main pipe system, said main pipe system including a main pipe and/or a main pipe valve body positioned between sections of said main pipe, said connecting piece having a longitudinal axis;
a fitting body disposed in said connecting piece, said fitting body being coaxially moveable along said longitudinal axis of said connecting piece;
a drill disposed on said fitting body, said drill being adapted for spot-drilling said main pipe system;
a branch connecting piece attached to said connecting piece, said branch connecting piece being adapted for connecting a branch pipe to said main pipe system;
a closing device including an actuating element, said closing device disposed in said branch connecting piece so that actuation of said closing device is performed in said branch connecting piece by said fitting body and so that said closing device is at least one of actuatable and externally releasable by axial movement of said fitting body; and
said closing device being a safety closing device which is automatically operative responsive to detecting a fluid pressure difference between an interior space of said connecting piece and an interior space of said branch connecting piece so that said closing device automatically closes said branch connecting piece to fluid flow therethrough upon detection of said pressure difference.

2. A fitting, comprising:
a connecting piece for connection to a main pipe system, said main pipe system including a main pipe and/or a main pipe valve body positioned between sections of said main pipe, said connecting piece having a longitudinal axis;
a fitting body disposed in said connecting piece, said fitting body being coaxially moveable along said longitudinal axis of said connecting piece;
connecting means disposed on said fitting body for connecting to said main pipe system;
a branch connecting piece attached to said connecting piece, said branch connecting piece being adapted for connecting a branch pipe to said main pipe system;
a closing device including an actuating element, said closing device disposed in said branch connecting piece so that actuation of said closing device is performed in said branch connecting piece by said fitting body and so that said closing device is at least one of actuatable and externally releasable by axial movement of said fitting body; and
said closing device being a safety closing device which is automatically operative responsive to detecting a fluid pressure difference between an interior space of said connecting piece and an interior space of said branch connecting piece so that said closing device automatically closes said branch connecting piece to fluid flow therethrough upon detection of said pressure difference.

3. The fitting of claim 2 wherein said connecting means comprises one or more of:
a drill disposed on said fitting body, said drill being adapted for spot-drilling said main pipe system; and
a valve sealing surface disposed at a bottom surface of said body and a valve seat disposed on a bottom surface of said connecting piece, said valve sealing surface being adapted for advancing against said valve seat and creating a sealing engagement therebetween.

4. The fitting of either claim 1 or claim 2, further comprising a closing valve body with a valve seat disposed in said closing device.

5. The fitting of claim 4, wherein said closing valve body is axially moveable relative to an axis of said closing device.

6. The fitting of claim 5, further comprising a guide body for guiding said closing valve body.

7. The fitting of claim 6, wherein said actuating element is connected to said guide body.

8. The fitting of claim 7, wherein said actuating element and said guide body are formed as a single monolithic piece.

9. The fitting of claim 6, wherein at least one of said actuating element and said guide body are moveable coaxially with said axis of said closing device.

10. The fitting of claim 9, wherein:
said actuating element is alternatively moveable between an initial position corresponding to an open position of said closing device and a final position corresponding to a closed position of said closing device, said actuating element being movable towards an inner space of said connecting piece.

11. The fitting of claim 10, wherein said guide body has at least one of an expanded shoulder and a holding element for limiting movement of said guide body in a direction of said inner space of said connecting piece.

12. The fitting of claim 10, wherein:
at least one of said guide body and said actuating element is moveably mounted on a bearing body in a region between said inner space and said closing valve body with said bearing body being moveable relative to said axis of said closing device.

13. The fitting of claim 12, further comprising a backing for moving said guide body.

14. The fitting of claim 13, wherein said backing is positioned on a side of said closing valve body averted from said inner space of said connecting piece.

15. The fitting of claim 13, further comprising a spring element which intercepts said closing valve body on said backing.

16. The fitting of claim 15, wherein said spring element surrounds said guide body.

* * * * *